United States Patent
Liu et al.

(10) Patent No.: US 11,102,422 B2
(45) Date of Patent: Aug. 24, 2021

(54) HIGH-DYNAMIC RANGE IMAGE SENSOR AND IMAGE-CAPTURE METHOD

(71) Applicant: OmniVision Technologies, Inc., Santa Clara, CA (US)

(72) Inventors: Chengming Liu, Fremont, CA (US); Tiejun Dai, Santa Clara, CA (US); Richard Mann, Santa Clara, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 0 days.

(21) Appl. No.: 16/431,887

(22) Filed: Jun. 5, 2019

(65) Prior Publication Data

US 2020/0389585 A1    Dec. 10, 2020

(51) Int. Cl.
| | | |
|---|---|---|
| H04N 5/235 | (2006.01) | |
| H04N 5/3745 | (2011.01) | |
| H04N 5/355 | (2011.01) | |

(52) U.S. Cl.
CPC ........ H04N 5/2355 (2013.01); H04N 5/3559 (2013.01); H04N 5/37452 (2013.01)

(58) Field of Classification Search
CPC .............. H04N 5/2355; H04N 5/3559; H04N 5/37452
See application file for complete search history.

(56) References Cited

U.S. PATENT DOCUMENTS

| 2008/0165264 A1 | 7/2008 | Saito et al. |
|---|---|---|
| 2010/0141792 A1 | 6/2010 | Arai |
| 2012/0219235 A1 | 8/2012 | Solhusvik et al. |
| 2014/0063300 A1 | 3/2014 | Lin et al. |
| 2015/0244916 A1* | 8/2015 | Kang ............ H04N 5/2355 348/222.1 |
| 2015/0256734 A1 | 9/2015 | Fukuhara |
| 2015/0256736 A1 | 9/2015 | Fukuhara |
| 2016/0028985 A1 | 1/2016 | Vogelsang et al. |
| 2016/0212355 A1 | 7/2016 | Pouli et al. |
| 2019/0342511 A1 | 11/2019 | Zhao |
| 2020/0236273 A1 | 7/2020 | Kang |

OTHER PUBLICATIONS

U.S. Appl. No. 16/558,499 Office Action dated Oct. 27, 2020, 9 pages.
Taiwan Patent Application No. 109117906 First Office Action dated Jun. 16, 2021, with English translation, 24 pages.

* cited by examiner

*Primary Examiner* — Gevell V Selby
(74) *Attorney, Agent, or Firm* — Lathrop GPM LLP

(57) ABSTRACT

A method for capturing a high-dynamic-range image includes: (i) storing a plurality of pixel values representing a first image captured by an image sensor that includes a pixel array, each pixel value having been generated by a respective pixel of a pixel subarray of the pixel array, each pixel being set to one of $N_1$ first exposure values, $N_1 \geq 1$; (ii) determining an exposure-count $N_2$ based on the plurality of pixel values; (iii) setting each pixel to one of a second plurality of exposure values, $N_2$ in number, such that, for each of the second plurality of exposure values, at least one pixel is set to that exposure value, one of the second plurality of exposure values differing from each of the $N_1$ first exposure values by more than a threshold value; and after setting (iv), capturing a second image with the image sensor.

20 Claims, 5 Drawing Sheets

500 ─┐

510
Store, in memory, a plurality of pixel values representing a first image captured by an image sensor that includes a pixel array. The pixel array includes a pixel sub-array, which includes a plurality of pixels.

▼

512
Read the plurality of pixel values from the memory while skipping additional pixel values generated by a plurality of additional pixels of the pixel sub-array.

▼

520
Determine an exposure-count $N_2$ based on the plurality of pixel values.

| 521 Generate histogram data from the plurality of pixel values. | 522 Apply an edge-detection method to the plurality of pixel values. | 523 Measure motion of the image sensor |
|---|---|---|
| 524 Compute a dispersion of a first sub-plurality of pixel values. | 526 Determine a number of saturated pixel-values, of the plurality of pixel values. | 528 Compare the first image to a previous image, captured prior to the first image to determine a presence of motion. |

▼

530
Determine, based on the plurality of pixel values, each of the second plurality of exposure values.

| 521 | → | 534 Determine each of the second plurality of exposure values based on the histogram data. |

▼

540
Set each of the plurality of pixels to one of the second plurality of exposure values.
Set $P_1$ % of the plurality of pixels to a 1st exposure value & $P_2$ % of the plurality of pixels to a 2nd exposure value.
  542 $P_1 - P_2 < 20$    544 $P_1 - P_2 > 50$ 550 Set $P_3$ % of the plurality of pixels to an intermediate exposure value

| 552 Determine a noise metric. | → | 558 Set $P_3$ % when noise, saturation, & incongruence metrics each exceed a threshold. | ← | 556 Determine an incongruence metric. |
| 554 Determine a saturation metric. | → | | | |

▼

560
Repeat at least one of steps 510, 512, 520, 530, and 540 for at least one additional pixel sub-array of the pixel array.

▼

570
Capture, with the plurality pixels set according to step 540, a second image with the image sensor.

FIG. 5

HIGH-DYNAMIC RANGE IMAGE SENSOR AND IMAGE-CAPTURE METHOD

BACKGROUND

Many consumer electronics products include at least one camera. These products include tablet computers, mobile phones, and smart watches. Such products, and digital still cameras themselves, may implement high-dynamic range (HDR) functionality to enable imaging of scenes having a large dynamic range of luminosity. The cameras include an image sensor having many pixels arranged as a pixel array. One way to capture an HDR image is for the image sensor to have a spatially-varying exposure value across the pixel array when the camera captures the image.

SUMMARY OF THE EMBODIMENTS

In a first aspect, a method for capturing a high-dynamic-range image includes: storing, in memory, a plurality of pixel values representing a first image captured by an image sensor that includes a pixel array, each of the plurality of pixel values having been generated by a respective one of a first plurality of pixels of a pixel subarray of the pixel array, each of the first plurality of pixels being set to one of $N_1$ first exposure values, $N_1 \geq 1$. The method also includes determining an exposure-count $N_2$ based on the plurality of pixel values. The method also includes setting each of the first plurality of pixels to one of a second plurality of exposure values, $N_2$ in number, such that, for each of the second plurality of exposure values, at least one pixel of the first plurality of pixels is set to that exposure value, one of the second plurality of exposure values differing from each of the $N_1$ first exposure values by more than a threshold value. The method also includes, after the step of setting each of the first plurality of pixels to one of a second plurality of exposure values, capturing a second image with the image sensor.

In a second aspect, an image sensor includes a pixel array, a processor coupled to the pixel array, and a memory. The memory stores machine-readable instructions that, when executed by the processor, control the processor to perform the method of the first aspect.

BRIEF DESCRIPTION OF THE FIGURES

FIG. 5 is a flowchart illustrating a method executable by the controller of FIG. 4 for capturing a high-dynamic-range image, in an embodiment.

DETAILED DESCRIPTION OF THE EMBODIMENTS

Figure 1:
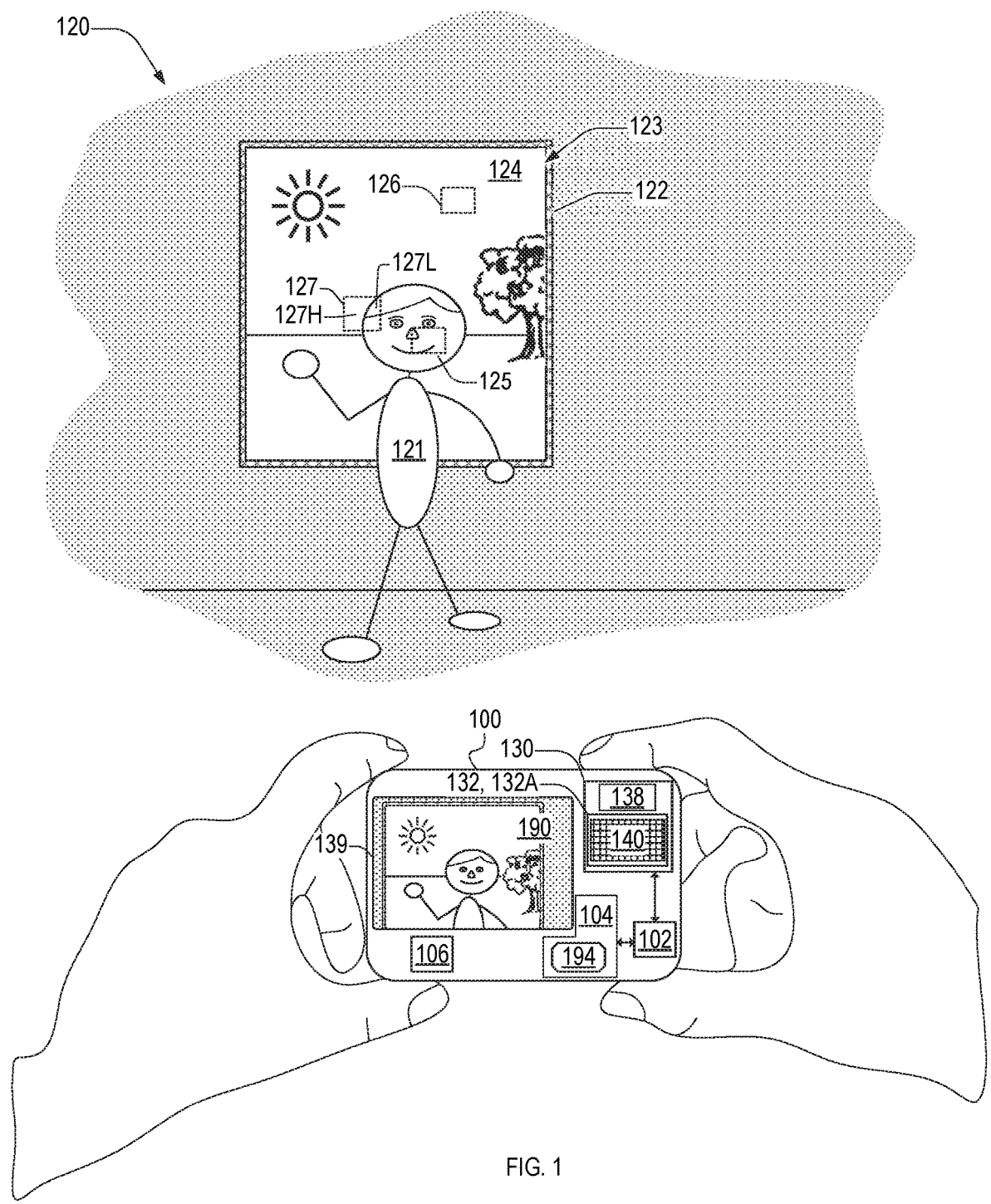
FIG. 1 depicts a scene being imaged by a camera that includes an image sensor, which includes a pixel array, according to an embodiment.

FIG. 1 depicts a camera 100 imaging a scene 120 that has a high dynamic range of luminance. Scene 120 includes a person 121 in front of a window 122, through which a sunny scene 123 is visible. Scene 120 includes a sky 124 and scene regions 125, 126, and 127. Scene regions 125 and 126 are entirely occupied by person 121 and sky 124, respectively. Scene region 127 includes part of sky 124 and part of person 121.

Camera 100 includes an imaging lens (not shown), an image sensor 130, a memory 104, and a processor 102 communicatively coupled to image sensor 130. Image sensor 130 includes a pixel array 132A, which may have a color filter array (CFA) 140 thereon. Pixel array 132A includes a plurality of pixels 132, not shown in FIG. 1 for clarity of illustration. Each color filter of CFA 140 may be aligned with a respective pixel 132 of pixel array 132A or with a center of a respective pixel subarray of pixel array 132A. A pixel subarray is, for example, an m×n array of pixels 132, where m and n are integers, at least one of which is greater than one. The imaging lens images scene 120 onto image sensor 130. Image sensor 130 also includes circuitry 138 that includes at least one analog-to-digital converter. Camera 100 may also include a motion sensor 106, which may include at least one accelerometer.

Each pixel 132 generates a respective pixel charge corresponding to a respective intensity of light from a scene 120 imaged onto pixel array 132A. Circuitry 138 converts each pixel charge to a respective one of a first plurality of pixel-values 192 of an image 190. Pixel-values 192 may be stored in memory 104. Camera 100 may include a display 139 configured to display image 190. Pixel-values 192 may be stored in memory 104 in either an image file format, such as JPEG or TIFF, or a raw image format, such as TIFF/EP or Digital Negative (DNG).

In scene 120, indoor lighting, not shown, illuminates the front of person 121 facing the camera while sunlight illuminates sunny scene 123. Hence, person 121 and sunny scene 123 have respective differing luminosities. Since the direct sunlight is typically significantly brighter than the indoor lighting, luminosity of sunny scene 123 far exceeds luminosity of person 121 such that scene 120 has a high dynamic range of luminosity. Standard digital imaging enables capture of scene 120 using a single exposure value optimized for either (but not both) luminosity of person 121 or sunny scene 123. Even when the exposure value is optimized for luminosity of person 121, the exposure time may be too long to capture of clear image of person 121, e.g., if person 121 is moving.

The exposure value associated with an image sensor pixel may depend on at least one of the following attributes of an image-sensor pixel: analog gain and exposure duration. Herein, given a first pixel set to a first exposure value and a second pixel set to a second exposure value that exceeds the first exposure value, the second pixel may be set to a second exposure duration (and/or gain) that exceeds a first exposure duration (and/or gain) associated with the first pixel.

Camera 100 may be configured to assign different exposure times to each of scene regions 125-127. The exposure time assigned to scene region 125 may exceed the exposure time assigned to scene region 126, as scene region 126 has higher luminosity. Scene region 127 includes two sub-regions 127H and 127L, which include sky 124 and person 121 respectively. The illumination of sub-region 127H is significantly higher than that of sub-region 127L. When camera 100 assigns an exposure time to scene region 127 optimized for sky 124, and hence sub-region 127H, the image of person 121 in sub-region 127L is under-exposed, and hence suffers from a low signal-to-noise ratio (SNR). When camera 100 assigns an exposure time to scene region 127 optimized for person 121, and hence sub-region 127L, the image of sky 124 121 in sub-region 127H is over-exposed, and hence suffers from saturation.

Figure 2:
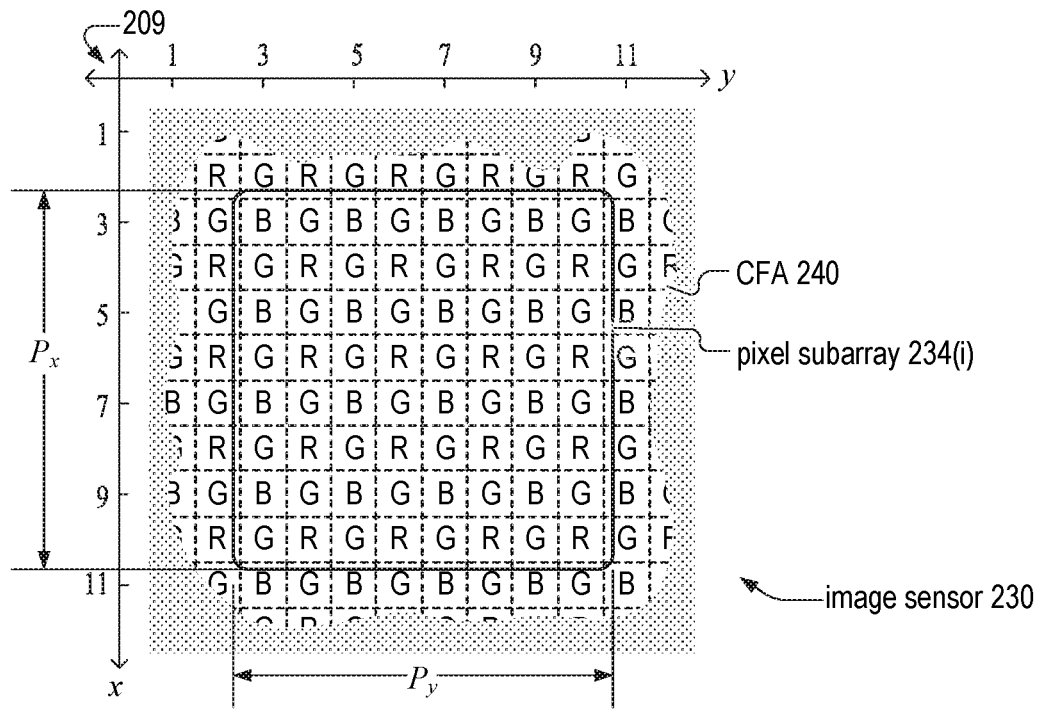
FIG. 2 is a schematic plan view of a region of an image sensor that includes the pixel array of FIG. 1, and a Bayer color filter array (CFA) thereon, in an embodiment.

FIG. 2 is a schematic plan view of a region of an image sensor 230 that includes a CFA 240. CFA 240 is an example of CFA 140. While FIG. 2 illustrates CFA 240 as a Bayer color-filter array with red, green, and blue color filters, CFA 240 may have red, green, and blue color filters arranged in a different pattern, or CFA 240 may include color filters having different respective transmission spectra. These transmission spectra may correspond to cyan, magenta, yellow, and panchromatic (e.g., white) light. Image sensor 230 and CFA 240 are examples of image sensor 130 and CFA 140 respectively.

Image sensor 230 and CFA 240 are positioned with respect to an x-y coordinate system 209. Coordinates (x,y) denote locations of each color filter and pixel therebeneath, where the origin of coordinate system 209 (x=y=0) may correspond to any pixel within pixel array 132A. Herein, all coordinates are expressed as (x,y) coordinates, that is, with the x value being listed first. Also, herein, the notation $\alpha(i,j)$ refers to a color filter at coordinate (x,y)=(i,j), where $\alpha$ denotes a transmission spectrum of a color filter and i and j are integers. For example, $\alpha$ is one of r, g, b, c, m, y, and k which represent, respectively, red, green, blue, cyan, magenta, yellow, and clear (panchromatic) color filters. A subscript on a coordinate pair indicates the type color filter, of CFA 240, covering a pixel 132 located at the coordinate. For example, pixel $p(x,y)_\alpha$ denotes a pixel 132, located at coordinate (x,y), that is covered by a color filter with a transmission spectrum denoted by $\alpha$. The pixel $p(x,y)_\alpha$ generates a primary pixel-value $V_\alpha(x,y)$.

Pixel array 134A includes a plurality of pixel subarrays 234 (1, 2, . . . , S), where S is a positive integer. For example, the S pixel subarrays 234 may be arranged in an m×n array, where m and n are positive integers, and S=m·n. Each pixel subarray 234 has pixel dimensions $P_x \times P_y$, where integers $P_x$ and $P_y$ may each be a power of two or a sum of two powers of two. In an embodiment, $P_y$ equals sixteen and $P_x$ equals either twenty-four or thirty-two.

Figure 3:
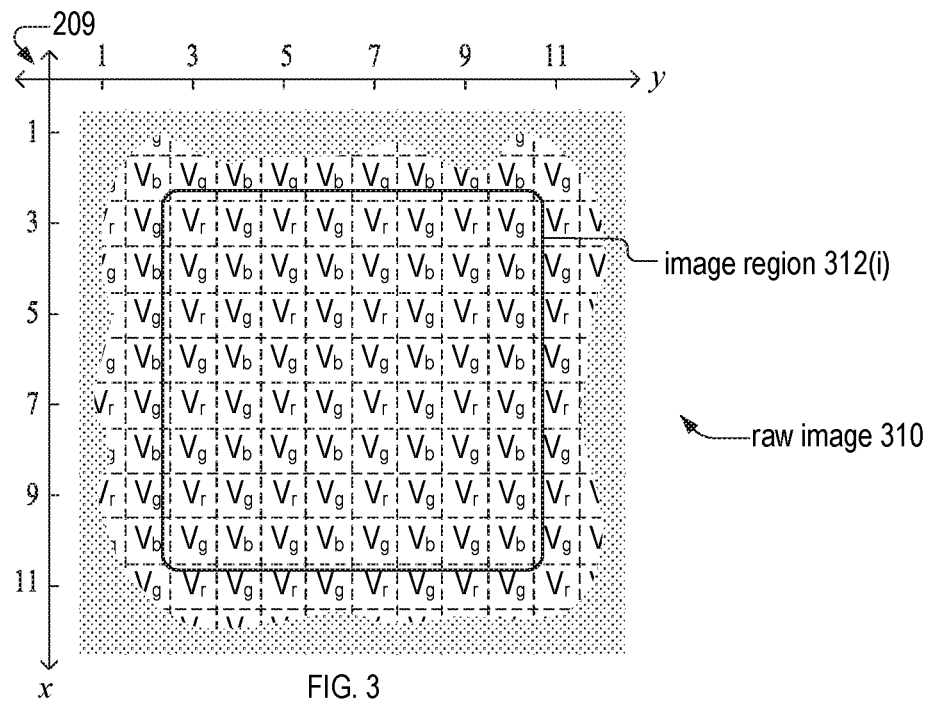
FIG. 3 is a schematic plan view of a region of a raw image corresponding to the region of the pixel array illustrated in FIG. 2.

FIG. 3 is a schematic plan view of a region of a raw image 310 corresponding to the region of pixel array 134A illustrated in FIG. 2. Raw image 310 is an example of image 190, and may include a plurality of pixel-values $V_{\alpha 1}$, a plurality of pixel-values $V_{\alpha 2}$, and a plurality of pixel-values $V_{\alpha 3}$. Each subscript $\alpha 1, \alpha 2, \alpha 3$ of pixel values V corresponds to one of transmission spectra $\alpha$ mentioned above. Raw image 310 may include a plurality of image regions 312(1-S), such that each image region 312(i) corresponds to a respective pixel subarray 234(i) of pixel array 134A, where integer i satisfies 1≤i≤R. Herein, notation ($X_1$-$X_2$) following a reference numeral is shorthand for denoting the range ($X_1$, $X_1$+1, . . . $X_2$−1, $X_2$), where $X_1$ and $X_2$ are integers.

One of image regions 312 may resemble scene region 127, FIG. 1, by including a first sub-region, characterized by a first luminosity, and a second sub-region characterized by a second luminosity that far exceeds the first luminosity. The second luminosity may exceed the first luminosity by at least a factor of two.

Each primary pixel-value $V_r$ is generated by a respective pixel 132 beneath a red color filter of CFA 140. Each primary pixel-value $V_g$ is generated by a respective pixel 132 beneath a green color filter of CFA 140. Each primary pixel-value $V_b$ is generated by a respective pixel 132 beneath a blue color filter of CFA 140. For example, primary pixel-values $V_r$, $V_g$, and $V_b$ at respective coordinates (3,4), (3,6), and (5,6) are generated by respective pixels of image sensor 230 at the same respective coordinates (3,4), (3,6), and (5,6). Expressed more concisely, and introducing a notational convention used herein, primary pixel-values $V_r(3,4)$, $V_b(3,6)$, and $V_g(5,6)$ are generated by respective pixels $p(3,4)_r$, $p(3,6)_g$, and $p(5,6)_b$ of image sensor 230.

Figure 4:
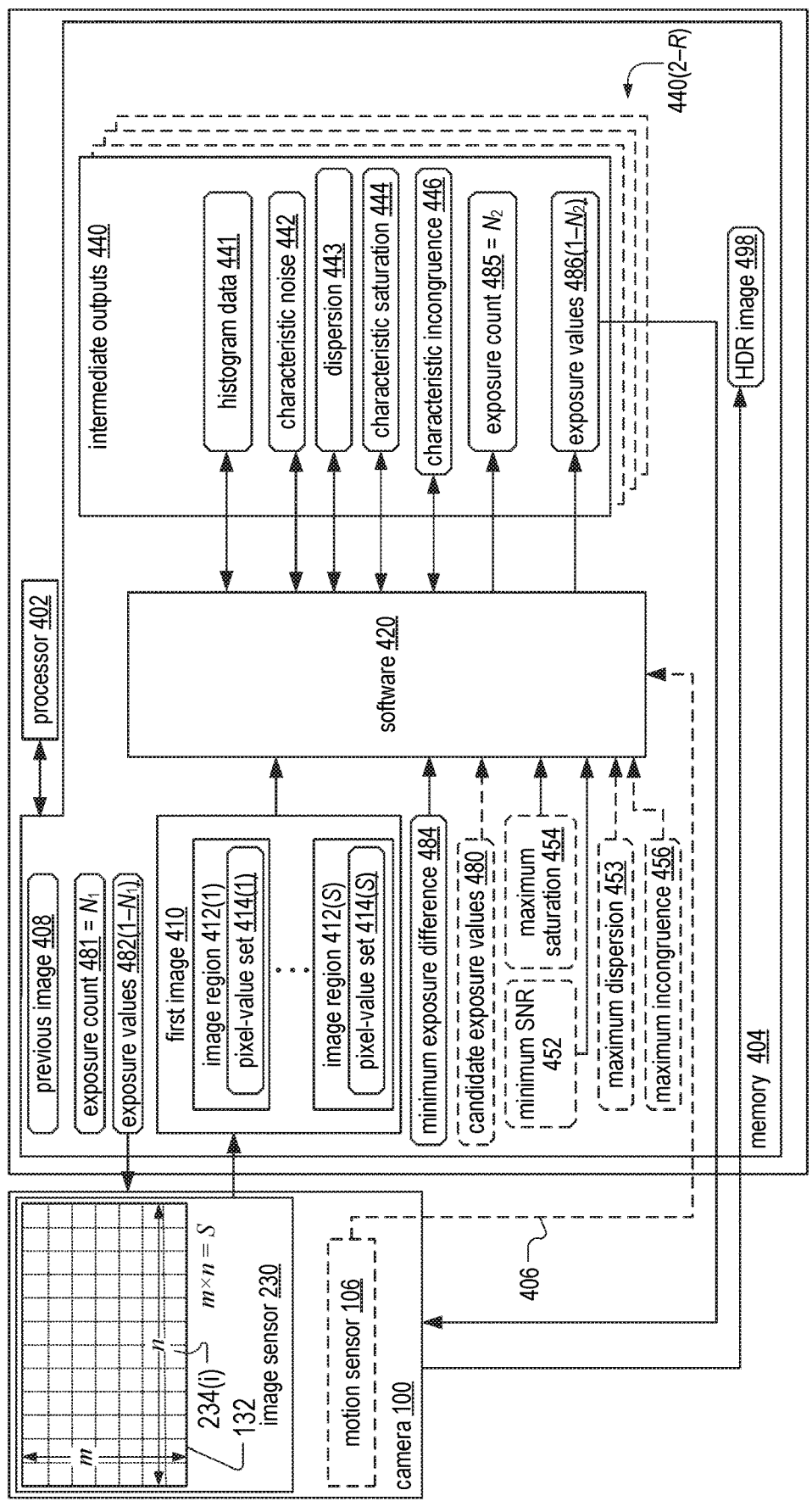
FIG. 4 is a schematic functional block diagram of an exposure controller configured to generate a high-dynamic range image, in an embodiment.

FIG. 4 is a schematic functional block diagram of an exposure controller 400 configured to generate, from a first image 410, an HDR image 498. Exposure controller 400 may be implemented within camera 100. Image 190 is an example of first image 410. HDR image 498 may be generated by capturing first image 410 with image sensor 230 and, for each pixel subarray 234 of image sensor 230 (FIG. 2) determining a plurality of exposure values 486 based on features of first image 410, and next capturing HDR image 498 using exposure values 486. What follows is a description of exposure controller 400, which may implement a method, described in FIG. 5, for capturing a high-dynamic-range image such as image 498.

Exposure controller 400 includes a processor 402 and a memory 404 that stores software 420, which includes computer-readable instructions. Processor 402 may be a digital signal processor such as an image processor. Memory 404 may be transitory and/or non-transitory and may include one or both of volatile memory (e.g., SRAM, DRAM, VRAM, or any combination thereof) and nonvolatile memory (e.g., FLASH, ROM, magnetic media, optical media, or any combination thereof).

Memory 404 and processor 402 may function as memory 104 and processor 102, respectively, of camera 100, FIG. 1. Processor 402 is adapted to execute the instructions to perform functions of exposure controller 400 as described herein. Memory 404 may store at least one of a previous image 408, a first image 410, an exposure count 481, exposure values 482, a minimum exposure difference 484, exposure values 486, and intermediate outputs 440. When executed by processor 402 software 420 produces intermediate outputs 440, which may include at least one of histogram data 411, characteristic noise 442, dispersion 443, a characteristic saturation 444, a characteristic incongruence 446, exposure count 485, and exposure values 486. Memory 404 may store a plurality of intermediate outputs 440, each corresponding to a respective image region 312 of raw image 310, FIG. 3. Accordingly, intermediate outputs 440 may be indexed as intermediate outputs 440(1, 2, . . . , S).

First image 410 is an example of image 190 and includes a plurality of image regions 412(1, 2, . . . , S) each corresponding to a respective pixel subarray 234(1, 2, . . . , S) of image sensor 230, FIG. 2. Each image region 412 is represented by a respective pixel-value set 414(i) generated by respective pixel subarray 234(i), where integer i is a pixel-subarray index, 1≤i≤R. Each pixel-value set 414(i) includes a plurality of pixel values equal to the number of pixels of pixel subarray 234(i). Each pixel of pixel subarray 234(i) is set to one of $N_1$ exposure values 482(1, 2, . . . , $N_1$), where $N_1$ is referred to herein as an exposure count and exposure count 481 is an integer equal to exposure count $N_1$.

Exposure count 485 is an integer herein also referred to as $N_2$. Software 420 may generate exposure values 486, from first image 410 for example, in which case exposure values 486 may be part of intermediate outputs 440. Exposure values 486 includes $N_2$ exposure values, one of which, exposure value 486(d), differs from each of exposure values 482 by more than minimum exposure difference 484. Index d is a positive integer less than or equal to $N_2$. Hence, exposure values 486 include an exposure value 486(d) not included in exposure values 482. Minimum exposure difference 484 may be greater than or equal to fifty percent of a minimum of exposure values 482. Exposure values 486 may include exposure values not included in exposure values 482.

Memory 404 may store a plurality of candidate exposure values 480, which include both exposure values 482 and exposure values 486. Candidate exposure values 480 may be at least one of: independent of first image 410, independent of any image stored in memory 404 or processed by processor 402, and determined prior to capture of first image 410. A maximum value of candidate exposure values 480 may be limited to ensure that motion artifact and frame rate limitations for the capture are obeyed. Camera 100 may include functionality that allows a user to set the maximum value.

Each exposure value 482(i) may represent a respective one of a plurality of non-overlapping exposure-value ranges, such that setting two pixels of image sensor 130 to the same exposure value 482 results in the two pixels having respective exposure values in the same exposure-value range, while not necessarily being equal. Similarly, each exposure value 486(i) may represent a respective one of a plurality of non-overlapping exposure-value ranges, such that setting two pixels of image sensor 130 to the same exposure value 486 results in the two pixels having respective exposure values in the same exposure-value range, while not necessarily being equal.

Memory 404 may store a minimum signal-to-noise ratio 452. In an imaging scenario, examples of a marginally acceptable signal-to-noise ratio and a good signal-to-noise ratio are three and ten, respectively. Minimum signal-to-noise ratio 452 may be greater than or equal to three. Memory 404 may store, as part of intermediate outputs 440, characteristic noise 442 of an image region 412(i). Characteristic noise 442 may be related to an average SNR of part or all of image region 412(i)

Memory 404 may store a maximum dispersion 453. Maximum dispersion 453 may be a statistical dispersion of pixel values or luminance values. A statistical dispersion of pixel values or luminance values of image region 412(i) that exceeds maximum dispersion 453 may indicate that image region 412(i) has a sufficiently high dynamic range, such that software 420 increases the exposure count of image region 412(i). Maximum dispersion 453 may include a standard deviation, a variance, a range, an interquartile range, a mean absolute difference, a median absolute deviation, an average deviation, or a combination thereof.

Memory 404 may store a maximum saturation 454, which may be a maximum allowable number of, or maximum allowable percentage of, saturated and/or near-saturated pixel values of a pixel-value set 414. Memory 404 may store, as part of intermediate outputs 440, a characteristic saturation 444 of an image region 412(0. Characteristic saturation 444 may be related to an average saturation of part or all of image region 412(i).

In embodiments, exposure values 486 includes exposure values 486(1), 486(2), and 486(3). In embodiments, each pixel set to exposure value 486(3) is side-adjacent to at least one other pixel also set to exposure value 486(3). See, for example, horizontally-adjacent pixel-pair 611, FIG. 6. Such a pairing of intermediate-exposure pixels requires less than memory (in both bits and spatial area) than when individual isolated pixels have an exposure values differing from each of their respective neighboring pixels. A second benefit of pairing intermediate-exposure pixels is that when pixel sizes are sufficiently small, a single isolated pixel with an intermediate exposure value, such as exposure value 486(3), is not sufficiently large to correspond to a scene region that requires the intermediate exposure value.

When choosing pixel arrangements to assign local exposures, a number of factors are considered to render an advantageous solution. In embodiments, grouping of nearby pixels (or pixel subarrays) to have the same exposure provides ability to provide a valid exposure based upon local scene information. Examples of nearby pixels includes adjacent pixels or interspersed pixels, such as a pair of pixels with one to three pixels therebetween (vertically, horizontally, or diagonally, or combinations thereof). Such interspersed pixel pairs allow for interpolation of exposure values between the pixel pair. In the above example, a pixel subarray may replace a pixel, such that two pixel subarrays are nearby as described in this paragraph.

The assignment of a plurality of nearby pixels e.g., of a pixel subarray 234, to the same exposure reduces the need for local memory to store the exposure value, e.g. exposure value 486. A reasonable balance may be achieved between smaller regions of exposure control with a need for a higher density of local exposure memory, and larger areas of local exposure control which allow the memory requirements to be more easily created in the device layout. In addition, the exact placement of pixels within a local exposure set e.g., a pixel subarray 234, may be engineered to provide an optimum ability to interpolate image details when only this local exposure set provides best information for rendering the local scene.

In embodiments, the number possible exposures within a local block of pixels is also optimized and/or configured in consideration of exposure control and memory requirements. A local group of pixels, e.g., of a pixel subarray 234, is served by a local memory block and the local group of pixels sharing the memory block may be apportioned to one, two, three, or more distinct exposure values (e.g., $N_2 \geq 1$). The selection of the number of distinct exposure values may be optimized to provide flexibility to deal with edges that demark relatively bright areas and relatively dark areas. (For example, a window frame illuminated by indoor lighting where the window shows bright outdoor lighting). For static scenes, a minimum of two different exposures may apply to each local area/memory block combination. When there is significant camera movement or dynamic objects in the scene, then software 420 may generate exposure count 485 to equal three.

In embodiments, the number of pixels that share a memory block's exposure assignments is also optimized based upon practical considerations of the relative size of pixels and the memory elements. The sharing of memory block by a large set of pixels makes rendering the memory block with multiple exposure options easier to achieve. (For example, a local set of pixels sharing a common exposure memory of size forty-by-thirty). The grouping of memory block/pixel sets into smaller sets enhances the ability to optimize exposure for local changes in scene contents but would require a more advanced technology and/or a more difficult layout to render the memory and required pixel connections). For example, at least one pixel sub-array 234 may be a twelve-by-eight block of pixels with a shared memory which serves three exposure subsets within the pixels.

FIG. 5 is a flowchart illustrating a method 500 for capturing a high-dynamic-range image. Method 500 is, for example, implemented within one or more aspects of exposure controller 400. For example, method 500 is implemented by processor 402 executing computer-readable instructions of software 420. Method 500 includes at least one of steps 510, 512, 520, 530, 540, 560, and 570.

Step 510 includes storing, in memory, a plurality of pixel values representing a first image captured by an image sensor that includes a pixel array. Prior to step 510, each of the plurality of pixel values had been generated by a respective one of a first plurality of pixels of a pixel subarray of the pixel array. Prior to generation of the plurality of pixel values, each of the first plurality of pixels had been set to one of $N_1$ first exposure values, $N_1 \geq 1$. In an example of step 510, exposure controller 400 stores pixel-value set 414(1). Each pixel value of pixel-value set 414(1) is generated by a pixel of pixel subarray 234(1), which is set to one of exposure values 482(1-$N_1$).

Step 512 applies when the pixel subarray includes, in addition to the first plurality of pixels, an additional plurality of pixels each located between a respective pair of the first plurality of pixels. Step 512 includes reading the plurality of pixel values from the memory while skipping additional pixel values generated by the additional plurality of pixels. In an example of step 512, the pixel subarray is pixel subarray 234(i), which includes a plurality of pixels $p_{odd}(x, y)$ and a plurality of pixels $p_{even}(x,y)$. Pixels denoted by $p_{odd}(x,y)$ are located at a coordinate (x,y) where both x and y are integers and the sum x+y is an odd integer. Pixels denoted by $p_{even}(x,y)$ are located at a coordinate (x,y) where both x and y are integers and the sum x+y is an even integer. In step 512, the first plurality of pixels may be $p_{odd}(x,y)$, while the additional plurality of pixels may be $p_{even}(x,y)$.

Step 520 includes determining an exposure count $N_2$ based on the plurality of pixel values. In example of step 520, software 420 determines exposure count 485 based on pixel-value set 414(1), where exposure count 485 equals $N_2$. Exposure count 485 determines a number of exposure values ($N_2$) of exposure values 486.

Step 520 may include at least one of steps 521, 522, 523, 524, 526, and 528 for determining exposure count $N_2$. Step 521 includes generating histogram data from the plurality of pixel values. In an example of step 521, software 420 generates histogram data 441 from pixel-value set 414(1). Software 420 determines exposure count 485 in part according to features of histogram data 441. For example, when histogram data 441 has, or is best fit to, a multimodal distribution (of pixel-value set 414(1)), exposure count 485 may be greater than or equal to a number of modes of the multimodal distribution.

Recall that pixel-value set 414(1) is generated by pixel subarray 234(1). When histogram data 441 corresponding to pixel-value set 414(1) is a multimodal distribution (a bimodal distribution, for example), software 420 may increase exposure counts 485 associated with pixel subarrays 234 that are immediately adjacent to pixel subarray 234(1). These adjacent pixel subarrays function as "buffer subarrays" that prevent over-exposure or under-exposure when camera 100 is moved during a time-interval between respective captures of first image 410 and HDR image 498.

Step 522 includes applying an edge-detection method to the plurality of pixel values, wherein step 520 sets $N_2 > N_1$ when an edge is detected and wherein step 520 sets $N_2 \leq N_1$ when no edge is detected. In an example of step 522, software 420 applies an edge-detection method to scene region 127, FIG. 1, which is an example of image region 412(1). When software 420 detects an edge in image region 412(1), software 420 sets exposure count 485 to an integer that exceeds exposure count 481. When software 420 does not detect an edge in image region 412(1), software 420 sets exposure count 485 to an integer that is less than or equal to exposure count 481.

Step 523 may apply when camera 100 includes motion sensor 106, which may generate motion data 406 associated with motion of camera 100, and hence of image sensor 230. Step 523 includes measuring motion of the image sensor, wherein exposure count $N_2$ is determined at least partly by the measured motion of the image sensor. In an example of step 523, software 420 determines exposure count 485 based on motion data 406 generated by motion sensor 106.

Step 524 may apply when the first plurality of pixels includes a first sub-plurality of pixels configured to detect light in a same spectral range and generating a respective first sub-plurality of pixel values of the plurality of pixel values. For example, the first sub-plurality of pixels may be two or more pixels of pixel subarray 234(i) beneath the same type of color filter, e.g., red (R), green (G), or blue (B) as illustrated in FIG. 2. Step 524 includes computing a dispersion of the first sub-plurality of pixel values. When the dispersion exceeds a threshold value, step 520, includes determining an exposure count $N_2$ that exceeds $N_1$. When the dispersion does not exceed the threshold value, step 520 includes determining an exposure count $N_2$ that is less than or equal to $N_1$. In an example of step 524, software 420 computes dispersion 443 of pixel-value set 414(1). When dispersion 443 exceeds maximum dispersion 453, software 420 sets exposure count 485 to an integer that exceeds exposure count 481. When dispersion 443 does not exceed maximum dispersion 453, software 420 sets exposure count 485 to an integer that is less than or equal to exposure count 481.

Step 526 includes determining a number of pixel-values, of the plurality of pixel values, that are saturated pixel values. When the number of saturated pixel-values exceeds a threshold value, step 520 includes setting $N_2$ to a value that exceeds $N_1$. When the number of saturated pixel-values is less than a threshold value, step 520 includes setting $N_2$ to a value that does not exceed $N_1$. When camera 100 has a bit-depth equal to an integer M, a saturated pixel-value equals $2^M - 1$. In step 526, "saturated pixel-values" may be replaced by "near-saturated pixel-values," where a near-saturated pixel-value differs from $2^M - 1$ by less than a predetermined value, such as $2^{M/2}$ or a different function of M.

In an example of step 526, software 420 determines a number of saturated pixel-values of pixel-value set 414(1). When the number of saturated pixel-values exceeds maximum saturation 454, software 420 determines exposure count 485 to be a positive integer that exceeds exposure count 481. When the number of saturated pixel-values does not exceed maximum saturation 454, software 420 determines exposure count 485 to be a positive integer that is less than or equal to exposure count 481.

Step 528 may apply when the image sensor had captured, prior to capture of the first image, a previous image of, or including, a scene captured by the first image. Step 528 includes comparing the previous image and the first image to determine a presence of either (i) object motion in the scene or (ii) image-sensor motion with respect to the scene, exposure-count $N_2$ being based at least in part on the presence of at least one of object motion and image-sensor motion. For example, when object motion and/or image-sensor motion is detected and exceeds a motion threshold, step 520 includes setting $N_2$ to a value that exceeds $N_1$. When object motion and/or image-sensor motion is not detected or does not exceed the motion threshold, step 520 includes setting $N_2$ to a value that does not exceed $N_1$.

In an example of step 528, software 420 compares previous image 408 to first image 410. Software 420 may compare a region of previous image 408 to a region of first image 410. For example, when step 520 determines an exposure count $N_2$ for pixel subarray 234(1), step 528 may compare a region of previous image 408 and a region of first image 410 each corresponding to image region 312(1) and one or more adjacent image regions thereto.

Step 530 includes determining, based on the plurality of pixel values, each of the second plurality of exposure values. In an example of step 530, software 420 determines exposure values 486 based on pixel-value set 414(1). Software 420 may determine exposure values 486 by selecting, based on pixel-value set 414(1), a plurality of candidate exposure values 480.

Step 530 may include at least one of step 521, described above, and step 534. Step 534 includes determining each of the second plurality of exposure values at least partly based on the histogram data generated in step 521 (as part of step 520 or as part of step 530). In an example of step 534, software 420 determines exposure values 486 at least partly based on histogram data 441.

Step 540 includes setting each of the first plurality of pixels to one of a second plurality of exposure values, $N_2$ in number. For each of the second plurality of exposure values, at least one pixel of the first plurality of pixels is set to that exposure value. One of the second plurality of exposure values differs from each of the $N_1$ first exposure values by more than a threshold value, such as minimum exposure difference 484. In an example of step 540, exposure controller 400 sets each pixel of pixel subarray 234(1) to one of exposure values 486.

Step 540 may include step 542 or step 544, which may apply when the second plurality of exposure values includes a first exposure value and a second exposure value. Both steps 542 and 544 include setting a first percentage of the first plurality of pixels to the first exposure value and a second percentage of the first plurality of pixels to the second exposure value. Step 542 results in the first percentage and the second percentage differing by less than twenty percentage points. Step 544 results in the first percentage and the second percentage differing by more than fifty percentage points. In an example of steps 542 and 544, software 420 sets a first percentage $P_1$ of pixel subarray 234(1) to exposure value 486(1) and sets a second percentage $P_2$ of pixel subarray 234(1) to exposure value 486(2). In this example of step 542, $|P_2-P_1|$ is less than twenty percentage points. In this example of step 544, $|P_2-P_1|$ exceeds fifty percentage points.

Step 540 may also include a step 550. Step 550 may apply when (i) exposure count 481 is greater than or equal to two ($N_1 \geq 2$), (ii) the $N_1$ exposure values includes "short" exposure values $E_1$ and "long" exposure value $E_2$ ($E_1<E_2$), a first percentage of the first plurality of pixels being set to exposure value $E_1$, and a second percentage of the first plurality of pixels being set to exposure value $E_2$, and (iii) exposure count 485 exceeds exposure count 481 ($N_2>N_1$). The $N_2$ exposure values include exposure values $E_1$, $E_2$, and $E_3$. Step 550 includes setting a third percentage of the first plurality of pixels to exposure value $E_3$, where $E_1<E_3<E_2$. In an example of step 550, software 420 sets a third percentage $P_3$ of pixel subarray 234(1) to an exposure value 486(3), which exceeds exposure value 486(1) and is less than exposure value 486(2).

Step 550 may include at least one of steps 552, 554, and 558. Step 552 includes determining a noise metric indicative of the signal-to-noise level of the first sub-plurality of pixel values. In an example of step 552, software 420 determines characteristic noise 442 of pixel values of pixel-value set 414(1) set to exposure value $E_1$.

Step 554 includes determining a saturation metric indicative of the degree of saturation of the second sub-plurality of pixel values. In an example of step 554, software 420 determines characteristic saturation 444 of pixel values of pixel-value set 414(1) set to exposure value $E_2$.

Step 556 includes determining an incongruence metric indicative of consistency of (i) a first scene brightness predicted by the first sub-plurality of pixel values, and (ii) a second scene brightness predicted by the second sub-plurality of pixel values. The first scene brightness may be equal or proportional to an average pixel value or pixel current of the first sub-plurality of pixel values divided by an exposure time corresponding to low exposure value $E_1$. The second scene brightness may be equal or proportional to an average pixel value or pixel current of the second sub-plurality of pixel values divided by an exposure time corresponding to high exposure value $E_2$. Absent image artifacts such a noise and saturation, the first scene brightness and the second scene brightness should be approximately equal (e.g., less than a ten-percent relative difference) or at least non-contradictory (congruent) because the first percentage of the first plurality of pixels and the second percentage of the first plurality of pixels detected light from the same part of the scene. Saturation may impose a lower limit on the second scene brightness, in which case the first scene brightness should be greater than or equal to the lower limit. Otherwise the first scene brightness and the second scene brightness are incongruent. In an example of step 556, software 420 determines characteristic incongruence 446.

Step 558 includes, in the step of setting the third percentage, setting the third percentage of the first plurality of pixels to the exposure value $V_3$ when each of the noise metric, the saturation metric, and the incongruence metric exceeds a respective threshold value. In an example of step 558, software 420 sets third percentage $P_3$ of pixel subarray 234(1) to exposure value 486(3) when characteristic noise 442 determined in step 552 exceeds minimum signal-to-noise ratio 452, characteristic saturation 444 determined in step 554 exceeds maximum saturation 454, and characteristic incongruence 446 determined in step 556 exceeds a maximum incongruence 456.

Step 560 includes repeating at least one of steps 510, 512, 520, 530, and 540 for at least one additional pixel subarray of the pixel array. In an example of step 560, software 420 executes at least one of steps 510, 512, 520, 530, and 540 for at least one of pixel subarrays 234(2, 3, . . . S).

Step 570 includes capturing, with the plurality pixels set according to step 540, a second image with the image sensor. In an example of step 540, camera 100 captures HDR image 498.

Figure 6:
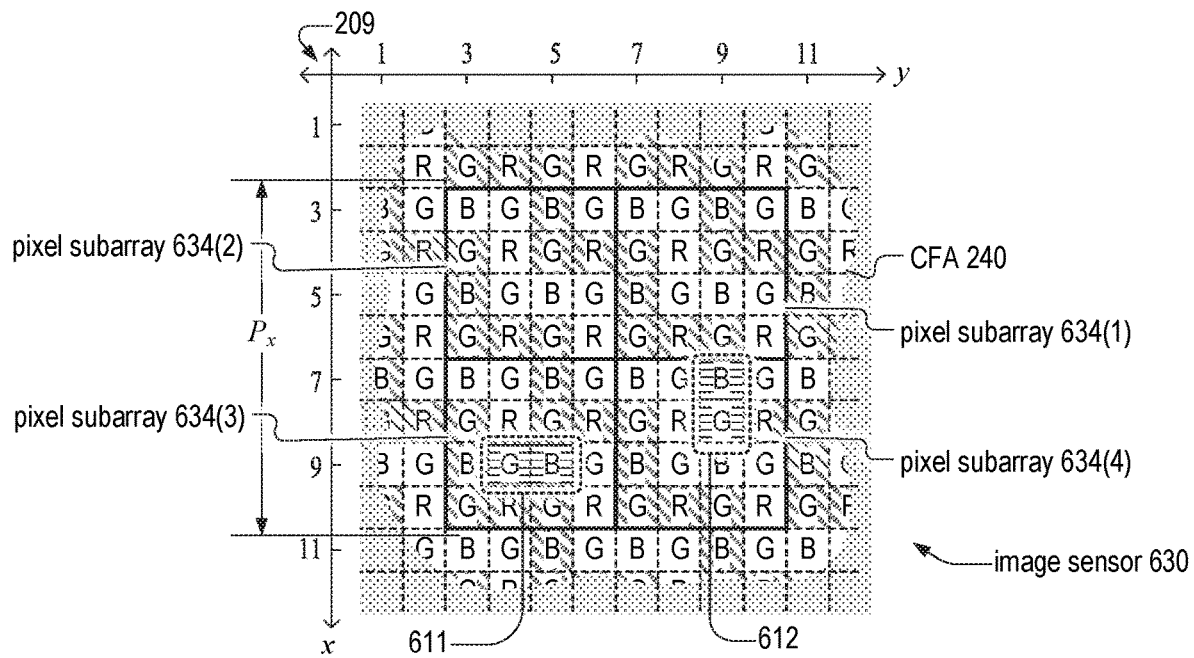
FIG. 6 is a schematic plan view of a region of an image sensor set to a first configuration of multiple exposure values, in an embodiment.

FIG. 6 is a schematic plan view of a region of an image sensor 630 that includes a plurality of pixel subarrays 634, each of which has an equal number of short-exposure pixels and long-exposure pixels arranged in a "zig-zag" pattern that is continuous across adjacent pixel subarrays 634. Image sensor 630 includes CFA 240 and is an example of image sensor 130, FIGS. 1 and 2. Each pixel subarray 634 is an example of a pixel subarray 234, and may be a result of step 540 of method 500. When image sensor 230 captures first image 410, at least one of pixel subarrays 234 may be one of pixel subarrays 734.

Herein, a short-exposure pixel of an image sensor is a pixel set to an exposure value or exposure time that is less than the exposure value or exposure time of a long-exposure pixel of the same image sensor. Also herein, any exposure value has a corresponding exposure time, such that when a second exposure value exceeds a first exposure value, the second exposure value may have a corresponding exposure time that exceeds a first exposure time corresponding to the first exposure value.

FIG. 6 illustrates pixel subarrays 634(1-4). Each pixel subarray 634 includes a four-by-four array of pixels each set to one of two exposure values, denoted in FIG. 6 by the presence ("shaded pixels") or absence ("unshaded pixels") of a diagonal hatching surrounding the color filter type designation ("R", "G", or "B") aligned above the pixel. Image sensor 630 may have an exposure-value configuration corresponding to a tiling of pixel subarrays 634(1-4) oriented in a two-by-two array as shown in FIG. 6.

When capturing first image 410, FIG. 4, shaded pixels and unshaded pixels of pixel subarray 634(1) may have respective exposure values 482(1) and 482(2), where exposure values 482(1) and 482(2) differ, e.g., by at least ten percent. When capturing HDR image 498, FIG. 4, shaded pixels and unshaded pixels of pixel subarray 634(1) may have respective exposure values 486(1) and 486(2), where exposure values 486(1) and 486(2) differ, e.g., by at least ten percent. In each pixel subarray 634, the number of shaded pixels (set to exposure value 482(1)) equals the number of unshaded pixels (set to exposure value 482(2)). Without departing from the scope of the embodiments, the number of shaded pixels may differ from the number of unshaded pixels in a subarray 634. In an embodiment, a ratio of the number of shaded pixels to the number of unshaded pixels is between five and seven. In an embodiment, a percentage of shaded pixels exceeds a percentage of unshaded pixels in pixel subarray 634 by more than fifty percentage points.

In an embodiment of method 500 when exposure count $N_2=2$ (per step 520), exposure controller 400 sets (per step 540) each pixel of pixel subarray 234(1) to one of two exposure values 486 such that pixel subarray 234(1) resembles pixel subarray 643(2).

One or more pixel subarrays 634 may include a pair of adjacent pixels set to a third exposure value, exposure value 482(3) for example. Exposure value 482(3) may be greater than exposure value 482(1) and less than exposure value 482(2), and hence is an example of an intermediate exposure value. For example, a first fraction of pixel-subarrays 634 may include a horizontally adjacent pair of pixels set to exposure value 482(3), as illustrated by horizontally-adjacent pixel-pair 611 within pixel subarray 634(3). Similarly, a second fraction of pixel-subarrays 634 may include a vertically-adjacent pair of pixels set to exposure value 482(3), as illustrated by vertically-adjacent pixel-pair 612 within pixel subarray 634(4). The first fraction may equal the second fraction, each of which may be between one-eighth and one-fourth. In an embodiment, the first fraction and the second fraction both equal one-sixth.

In an embodiment of method 500 when exposure count $N_2=3$ (per step 520), exposure controller 400 sets (per step 540) each pixel of pixel subarray 234(1) to one of three exposure values 486 such that pixel subarray 234(1) resembles pixel subarray 643(3).

FIG. 6 illustrates pixel-pairs 611 and 612 as decreasing the number of pixels in pixel subarrays 634 with exposure values 486(2) (unshaded) and 486(1) (shaded), respectively. Without departing from the scope hereof, pixel-pairs 611 and 612 may be spatially shifted such that they decrease the number of pixels in pixel subarrays 634 with exposure values 486(1) and 486(2), respectively.

Figure 7:
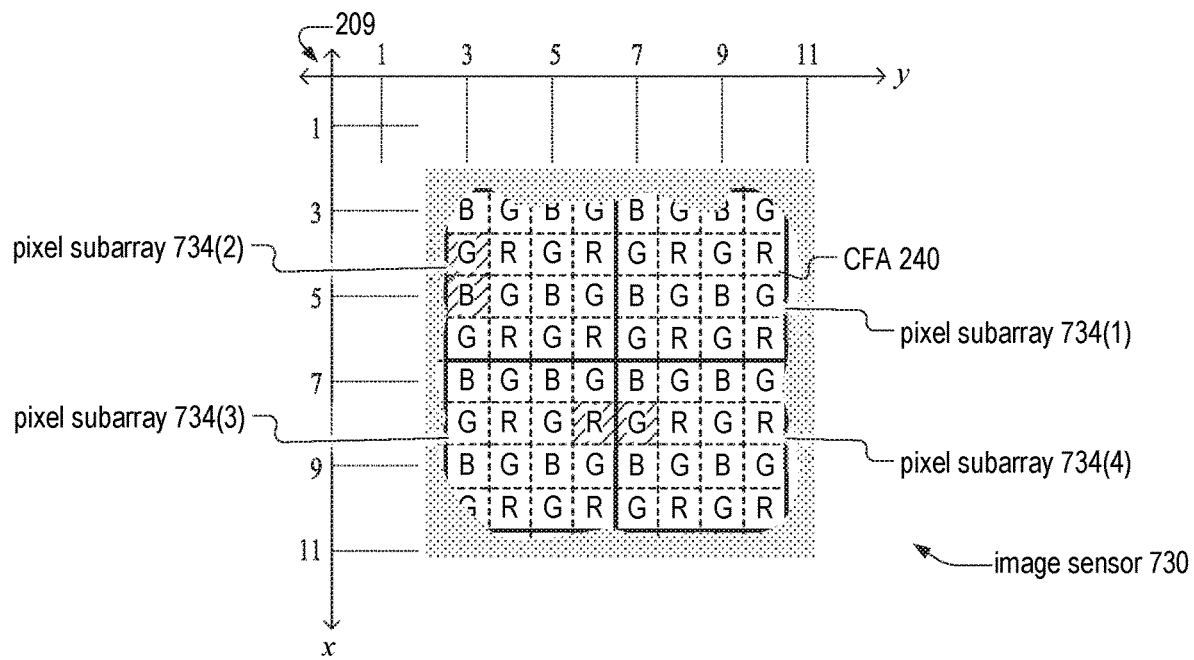
FIG. 7 is a schematic plan view of a region of an image sensor set to a second configuration of multiple exposure values, in an embodiment.

FIG. 7 is a schematic plan view of a region of an image sensor 730 that includes a plurality of pixel subarrays 734. Image sensor 730 may include CFA 240 and is an example of image sensor 130, FIGS. 1 and 2. Each pixel subarray 734 is an example of a pixel subarray 234, FIG. 3, and may be a result of step 540 of method 500. When image sensor 230 captures first image 410, at least one of pixel subarrays 234 may be one of pixel subarrays 734.

Each pixel subarray 734 has a first fraction of short-exposure pixels (shaded) and second fraction long-exposure pixels (unshaded), where the first fraction may equal one of zero, one-sixteenth or one-eighth. Each short-exposure pixel and each long-exposure pixel may have respective exposure values 482(1) and 482(2), where exposure value 482(2) exceeds exposure value 482(1). The exposure value of any pixel of a pixel subarray 734 may be modified to change from exposure value 482(1) to 482(2) or from exposure value 482(2) to 482(1). For example, while FIG. 7 illustrates pixels at (x,y) coordinates (9,6) and (4,10) as unshaded, and hence having exposure value 482(2), the exposure value of one or both of these pixels may be changed to exposure value 482(1). In an embodiment, the color filter coordinate (4,6) is a green color filter (rather than red), and the two horizontally-adjacent pixels located at (4,6) and (4,7) may function as phase-detection auto-focus pixels and share a common microlens. Image sensor 730 may have an exposure-value configuration corresponding to a tiling of pixel subarrays 734(1-4) oriented in a two-by-two array as shown in FIG. 7.

Combinations of Features

Features described above as well as those claimed below may be combined in various ways without departing from the scope hereof. The following enumerated examples illustrate some possible, non-limiting combinations:

(A1) A method for capturing a high-dynamic-range image includes: storing, in memory, a plurality of pixel values representing a first image captured by an image sensor that includes a pixel array, each of the plurality of pixel values having been generated by a respective one of a first plurality of pixels of a pixel subarray of the pixel array, each of the first plurality of pixels being set to one of $N_1$ first exposure values, $N_1 \geq 1$. The method also includes determining an exposure-count $N_2$ based on the plurality of pixel values. The method also includes setting each of the first plurality of pixels to one of a second plurality of exposure values, $N_2$ in number, such that, for each of the second plurality of exposure values, at least one pixel of the first plurality of pixels is set to that exposure value, one of the second plurality of exposure values differing from each of the $N_1$ first exposure values by more than a threshold value. The method also includes, after setting, capturing a second image with the image sensor.

(A2) The method (A1) may further include determining, based on the plurality of pixel values, each of the second plurality of exposure values.

(A3) The method (A2) may further include generating histogram data from the plurality of pixel values and determining each of the second plurality of exposure values based on the histogram data.

(A4) When the pixel subarray includes, in addition to the first plurality of pixels, an additional plurality of pixels each located between a respective pair of the first plurality of pixels, any of methods (A1) through (A3) may further include reading the plurality of pixel values from the memory while skipping additional pixel values generated by the additional plurality of pixels.

(A5) In any of methods (A1)-(A4), the step of determining may include applying an edge-detection method to the plurality of pixel values, $N_2$ exceeding $N_1$ when an edge is detected and $N_2$ not exceeding $N_1$ when no edge is detected.

(A6) In any of methods (A1)-(A5), when the first plurality of pixels includes a first sub-plurality of pixels configured to detect light in a same spectral range and generates a respective first sub-plurality of pixel values of the plurality of pixel values, the step of determining may include computing a dispersion of the first sub-plurality of pixel values, $N_2$ exceeding $N_1$ when the dispersion exceeds a threshold value and $N_2$ not exceeding $N_1$ when the dispersion is less than a threshold value.

(A7) In any of methods (A1)-(A6), the step of determining may include determining a number of saturated pixel-values, of the plurality of pixel values, $N_2$ exceeding $N_1$ when the number of saturated pixel-values exceeds a threshold value and $N_2$ not exceeding $N_1$ when the number of saturated pixel-values is less than a threshold value.

(A8) In any of methods (A1)-(A7), when the first image is of a scene, the step of determining may include comparing a previous image and the first image to determine a presence of either (i) object motion in the scene or (ii) image-sensor motion with respect to the scene, exposure-count $N_2$ being based at least in part on the presence of at least one of object motion and image-sensor motion, the previous image including the scene and captured by the image sensor prior to capture of the first image.

(A9) In any of methods (A1)-(A8), when the second plurality of exposure values including a first exposure value and a second exposure value, the step of setting may further include setting a first percentage of the first plurality of pixels to the first exposure value and a second percentage of the first plurality of pixels to the second exposure value, the first percentage and the second percentage differing by less than twenty percentage points (A10) When $N_1 \geq 2$, the $N_1$ exposure values include exposure values $V_1$ and $V_2$, a first percentage of the first plurality of pixels have exposure value $V_1$, a second percentage of the first plurality of pixels have exposure value $V_2$, and in the step of determining, $N_2 > N_1$, the $N_2$ exposure values include exposure values $V_1$, $V_2$, and $V_3$, any of methods (A1)-(A9) may further include setting a third percentage of the first plurality of pixels to exposure value $V_3$, $V_1 < V_3 < V_2$.

(A11) When the first percentage of the first plurality of pixels have generated a first sub-plurality of pixel values, the second percentage of the first plurality of pixels have generated a second sub-plurality of pixel values, method (A10) may further include: determining a noise metric indicative of a signal-to-noise level of the first sub-plurality of pixel values; determining a saturation metric indicative of a degree of saturation of the second sub-plurality of pixel values; determining an incongruence metric indicative of consistency of a first scene brightness, predicted by the first sub-plurality of pixel values, and a second scene brightness predicted by the second sub-plurality of pixel values; and in the step of setting the third percentage, setting the third percentage of the first plurality of pixels to the exposure value $V_3$ when each of the noise metric, the saturation metric, and the incongruence metric exceeds a respective threshold value.

(A12) In any of methods (A10) and (A11), the first percentage and the second percentage may differ by less than twenty percentage points, and in the step of setting the third percentage, the third percentage may be less than twenty percentage points.

(A13) In any of methods (A1) through (A12), the step of setting may further include setting a first percentage of the first plurality of pixels to a first exposure value and second percentage of the first plurality of pixels to a second exposure value, the first percentage and the second percentage differing by more than fifty percentage points.

(B1) An image sensor includes a pixel array, a processor coupled to the pixel array, and a memory. The memory stores machine-readable instructions that, when executed by the processor, control the processor perform any of the methods (A1)-(A13).

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

What is claimed is:

1. A method for capturing a high-dynamic-range image comprising:
   storing, in memory, a plurality of pixel values representing a first image captured by an image sensor that includes a pixel array, each of the plurality of pixel values having been generated by a respective one of a first plurality of pixels of a pixel subarray of the pixel array, each of the first plurality of pixels being set to one of $N_1$ first exposure values, $N_1 \geq 1$;
   reading the plurality of pixel values from the memory while skipping additional pixel values generated by an additional plurality of pixels, of the pixel subarray, each located between a respective pair of the first plurality of pixels;
   determining an exposure-count $N_2$ based on the plurality of pixel values, $N_2$ being a positive integer;
   setting each of the first plurality of pixels to one of a second plurality of exposure values, $N_2$ in number, such that, for each of the second plurality of exposure values, at least one pixel of the first plurality of pixels is set to that exposure value, one of the second plurality of exposure values differing from each of the $N_1$ first exposure values by more than a threshold value; and
   after setting, capturing a second image with the image sensor.

2. The method of claim 1, further comprising:
   determining, based on the plurality of pixel values, each of the second plurality of exposure values.

3. The method of claim 1, further comprising:
   generating histogram data from the plurality of pixel values; and
   determining each of the second plurality of exposure values based on the histogram data.

4. The method of claim 1, the step of determining comprising:
   applying an edge-detection method to the plurality of pixel values, $N_2$ exceeding $N_1$ when an edge is detected, and $N_2$ not exceeding $N_1$ when no edge is detected.

5. The method of claim 1, the first plurality of pixels including a first sub-plurality of pixels configured to detect light in a same spectral range and generating a respective first sub-plurality of pixel values of the plurality of pixel values, the step of determining comprising:

computing a dispersion of the first sub-plurality of pixel values, $N_2$ exceeding $N_1$ when the dispersion exceeds a threshold value, and $N_2$ not exceeding $N_1$ when the dispersion is less than a threshold value.

6. The method of claim 1, the step of determining comprising:

determining a number of saturated pixel-values, of the plurality of pixel values, $N_2$ exceeding $N_1$ when the number of saturated pixel-values exceeds a threshold value, and $N_2$ not exceeding $N_1$ when the number of saturated pixel-values is less than a threshold value.

7. The method of claim 1, the first image being of a scene, the step of determining including:

comparing a previous image and the first image to determine a presence of either (i) object motion in the scene or (ii) image-sensor motion with respect to the scene, exposure-count $N_2$ being based at least in part on the presence of at least one of object motion and image-sensor motion, the previous image including the scene and captured by the image sensor prior to capture of the first image.

8. The method of claim 1, the second plurality of exposure values including a first exposure value and a second exposure value, the step of setting further comprising setting a first percentage of the first plurality of pixels to the first exposure value and a second percentage of the first plurality of pixels to the second exposure value, the first percentage and the second percentage differing by less than twenty percentage points.

9. The method of claim 1, $N_1 \geq 2$, the $N_1$ exposure values including exposure values $V_1$ and $V_2$, a first percentage of the first plurality of pixels having exposure value $V_1$, a second percentage of the first plurality of pixels having exposure value $V_2$, and in the step of determining, $N_2 > N_1$, the $N_2$ exposure values including exposure values $V_1$, $V_2$, and $V_3$, and further comprising:

setting a third percentage of the first plurality of pixels to exposure value $V_3$, $V_1 < V_3 < V_2$.

10. The method of claim 9, the first percentage of the first plurality of pixels having generated a first sub-plurality of pixel values, the second percentage of the first plurality of pixels having generated a second sub-plurality of pixel values, and further comprising:

determining a noise metric indicative of a signal-to-noise level of the first sub-plurality of pixel values;

determining a saturation metric indicative of a degree of saturation of the second sub-plurality of pixel values;

determining an incongruence metric indicative of consistency of a first scene brightness, predicted by the first sub-plurality of pixel values, and a second scene brightness predicted by the second sub-plurality of pixel values; and in the step of setting the third percentage, setting the third percentage of the first plurality of pixels to the exposure value $V_3$ when each of the noise metric, the saturation metric, and the incongruence metric exceeds a respective threshold value.

11. The method of claim 9, the first percentage and the second percentage differing by less than twenty percentage points, and in the step of setting the third percentage, the third percentage being less than twenty percentage points.

12. The method of claim 1, the step of setting further comprising:

setting a first percentage of the first plurality of pixels to a first exposure value and second percentage of the first plurality of pixels to a second exposure value, the first percentage and the second percentage differing by more than fifty percentage points.

13. The method of claim 1, further comprising:

generating histogram data from the plurality of pixel values; and when determining the exposure-count $N_2$, determining the exposure-count $N_2$ based on the histogram data.

14. An image sensor comprising:

a pixel array including a pixel subarray that includes (i) a first plurality of pixels, and (ii) an additional plurality of pixels each located between a respective pair of the first plurality of pixels;

a processor coupled to the pixel array; and a memory storing machine-readable instructions that, when executed by the processor, control the processor to:

read a plurality of pixel values from the memory while skipping additional pixel values generated by the additional plurality of pixels;

store, in the memory, the plurality of pixel values representing a first image captured by the image sensor, each of the plurality of pixel values having been generated by a respective one of the first plurality of pixels, each of the first plurality of pixels being set to one of $N_1$ first exposure values, $N_1 \geq 1$;

determine an exposure-count $N_2$ based on the plurality of pixel values, $N_2$ being a positive integer;

set each of the first plurality of pixels to one of a second plurality of exposure values, $N_2$ in number, such that, for each of the second plurality of exposure values, at least one pixel of the first plurality of pixels is set to that exposure value, one of the second plurality of exposure values differing from each of the $N_1$ first exposure values by more than a threshold value;

and, after setting;

capture a second image with the image sensor.

15. The image sensor of claim 14, the first plurality of pixels including a first sub-plurality of pixels configured to detect light in a same spectral range and generating a respective first sub-plurality of pixel values of the plurality of pixel values, the memory further storing machine-readable instructions that, when executed by the processor, control the processor to, when determining the exposure count $N_2$:

compute a dispersion of the first sub-plurality of pixel values, $N_2$ exceeding $N_1$ when the dispersion exceeds a threshold value and $N_2$ not exceeding $N_1$ when the dispersion is less than a threshold value.

16. A method for capturing a high-dynamic-range image comprising:

storing, in memory, a plurality of pixel values representing a first image captured by an image sensor that includes a pixel array, each of the plurality of pixel values having been generated by a respective one of a first plurality of pixels of a pixel subarray of the pixel array, each of the first plurality of pixels being set to one of $N_1$ first exposure values, $N_1 \geq 1$;

determining an exposure-count $N_2$ by applying an edge-detection method to the plurality of pixel values, $N_2$ being a positive integer that exceeds $N_1$ when an edge is detected, and is less than or equal to $N_1$ when no edge is detected;

setting each of the first plurality of pixels to one of a second plurality of exposure values, $N_2$ in number, such that, for each of the second plurality of exposure values, at least one pixel of the first plurality of pixels is set to that exposure value, one of the second plurality of exposure values differing from each of the $N_1$ first exposure values by more than a threshold value; and after setting, capturing a second image with the image sensor.

17. The method of claim 16, the first plurality of pixels including a first sub-plurality of pixels configured to detect light in a same spectral range and generating a respective first sub-plurality of pixel values of the plurality of pixel values, the step of determining comprising:

computing a dispersion of the first sub-plurality of pixel values, $N_2$ exceeding $N_1$ when the dispersion exceeds a threshold value, and $N_2$ not exceeding $N_1$ when the dispersion is less than a threshold value.

18. The method of claim 16, the step of determining comprising:

determining a number of saturated pixel-values, of the plurality of pixel values, $N_2$ exceeding $N_1$ when the number of saturated pixel-values exceeds a threshold value, and $N_2$ not exceeding $N_1$ when the number of saturated pixel-values is less than a threshold value.

19. The method of claim 16, the first image being of a scene, the step of determining including:

comparing a previous image and the first image to determine a presence of either (i) object motion in the scene or (ii) image-sensor motion with respect to the scene, exposure-count $N_2$ being based at least in part on the presence of at least one of object motion and image-sensor motion, the previous image including the scene and captured by the image sensor prior to capture of the first image.

20. The method of claim 16, the second plurality of exposure values including a first exposure value and a second exposure value, the step of setting further comprising setting a first percentage of the first plurality of pixels to the first exposure value and a second percentage of the first plurality of pixels to the second exposure value, the first percentage and the second percentage differing by less than twenty percentage points.

* * * * *